April 10, 1962 J. C. MORPHET, JR 3,029,389
FREQUENCY SHIFTING SELF-SYNCHRONIZING CLOCK
Filed April 20, 1960 4 Sheets-Sheet 1

INVENTOR
JOHN C. MORPHET, JR.

BY Sughrue, Rothwell, Mion, & Zinn
ATTORNEYS

April 10, 1962 J. C. MORPHET, JR 3,029,389

FREQUENCY SHIFTING SELF-SYNCHRONIZING CLOCK

Filed April 20, 1960 4 Sheets-Sheet 2

United States Patent Office 3,029,389

Patented Apr. 10, 1962

3,029,389
FREQUENCY SHIFTING SELF-SYNCHRONIZING CLOCK

John C. Morphet, Jr., Hyde Park, N.Y., assignor to International Business Machines Corporation, New York, N.Y., a corporation of New York Filed Apr. 20, 1960, Ser. No. 23,460
14 Claims. (Cl. 328—55)

Figure 1:
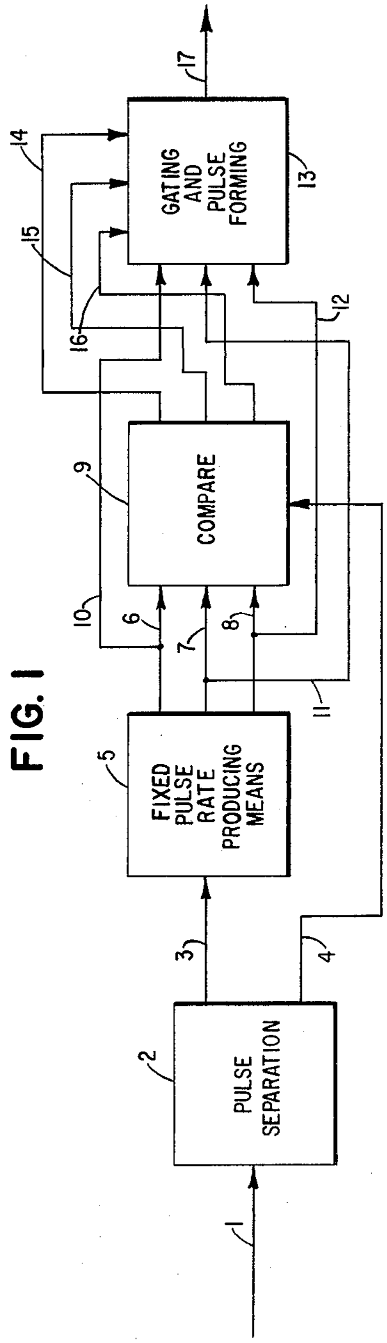

This invention relates in general to self-clocking systems for binary data signals, and in particular, to a system which provides output pulses that are frequency shifted to one of three frequencies relative to the frequency of the input pulses.

Generally, in order to recover the information contained in a binary coded digital data signal, the signal must be sampled at each bit time. A bit time may be defined as an interval of time during which a binary "1" or a binary "0" occurs. In many systems, a binary "1" is indicated by the presence of a pulse, while a binary "0" is represented by the absence of a pulse. This sampling operation, referred to in the art as "clocking," is accomplished under the control of a clock signal and provides a clock pulse at each bit time. In situations where the frequency or bit rate of the data signal does not vary, the sampling operation creates little or no problem, in that a stable oscillator having a signal frequency corresponding to the bit rate of the data signal may be provided, and once the two different signal trains are synchronized, the sampling may proceed without incident.

In some situations the bit rate of the binary coded data signal is not constant, but varies slowly over a small range of frequencies. Such an instance is best exemplified in the case where the binary data signal is being generated by a transducer scanning a magnetic record. It will be seen that the bit rate of the data signal is directly related to the scanning rate, and hence when the scanning rate changes the data signal is no longer in synchronism with a clock signal derived from an independent oscillator.

In order to avoid the problem caused by changes in the scanning rate, the prior art has suggested recording a permanent clock track on the recording surface so that if the scanning rate varies, the frequency of both data and clock signals are affected in the same manner and, hence, are maintained in synchronism. While this clocking arrangement undoubtedly has many advantages, it also has some limitations, particularly where more than one cyclic record carrier is employed with a common clock track, where more than one reading transducer is employed with a common recording path, and where the reading transducer moved to different recording paths.

To avoid the problems encountered with a pre-recorded clock track, the present invention discloses a frequency shifting clock pulse generator which receives data bit pulses from a varying rate source, such as a magnetic surface whose driven speed is changing, and shifts the frequency of the output clock pulses to one of a plurality of different discrete fixed frequencies depending upon which one of the plurality of fixed frequencies most closely corresponds to the frequency of the bit pulses. In the present embodiment of the invention, the above-mentioned plurality of fixed frequencies is chosen to correrespond to the nominal, worst case high, and worst case low frequencies of the bit pulses. Furthermore, during periods when no pulses are being received from the source, which in most systems corresponds to an indication of binary "0" information, the frequency shifting clock will provide output clock pulses at the average frequency of the last few bit pulses received by it from the varying source.

It is therefore an object of the invention to provide a frequency shifting self-synchronizing clock responsive to bit pulses from a varying rate source, comprising a plurality of means each adapted to produce pulses at a fixed rate different from the pulse rate produced by any other of said plurality means, an output channel, means for determining which of said fixed pulse rates is closest to the bit pulse rate of said variable source, and means responsive to said determining means for directing said closest fixed rate pulses to said output channel.

Another object of the invention is to provide a frequency shifting self-synchronizing clock comprising three multivibrators each producing pulses at a frequency different from the other multivibrators, means for resetting each of said multivibrators to the beginning of its cycle upon receipt of each odd bit pulse from the varying rate source, means for comparing the output of each of the multivibrators with each even bit pulse received from the varying rate source for determining which multivibrator rate is closest to the bit pulse rate, and means for selectively connecting to an output channel the multivibrator having the closest rate to the bit pulse rate.

Other objects and advantages of the present invention will be set forth in the following description of the invention which is to be taken in connection with the accompanying drawings, in which:

FIGURE 1 shows a block diagram of the frequency shifting self-synchronizing clock;

FIGURE 1 shows the logic diagram of the invention; and

Figure 3A:
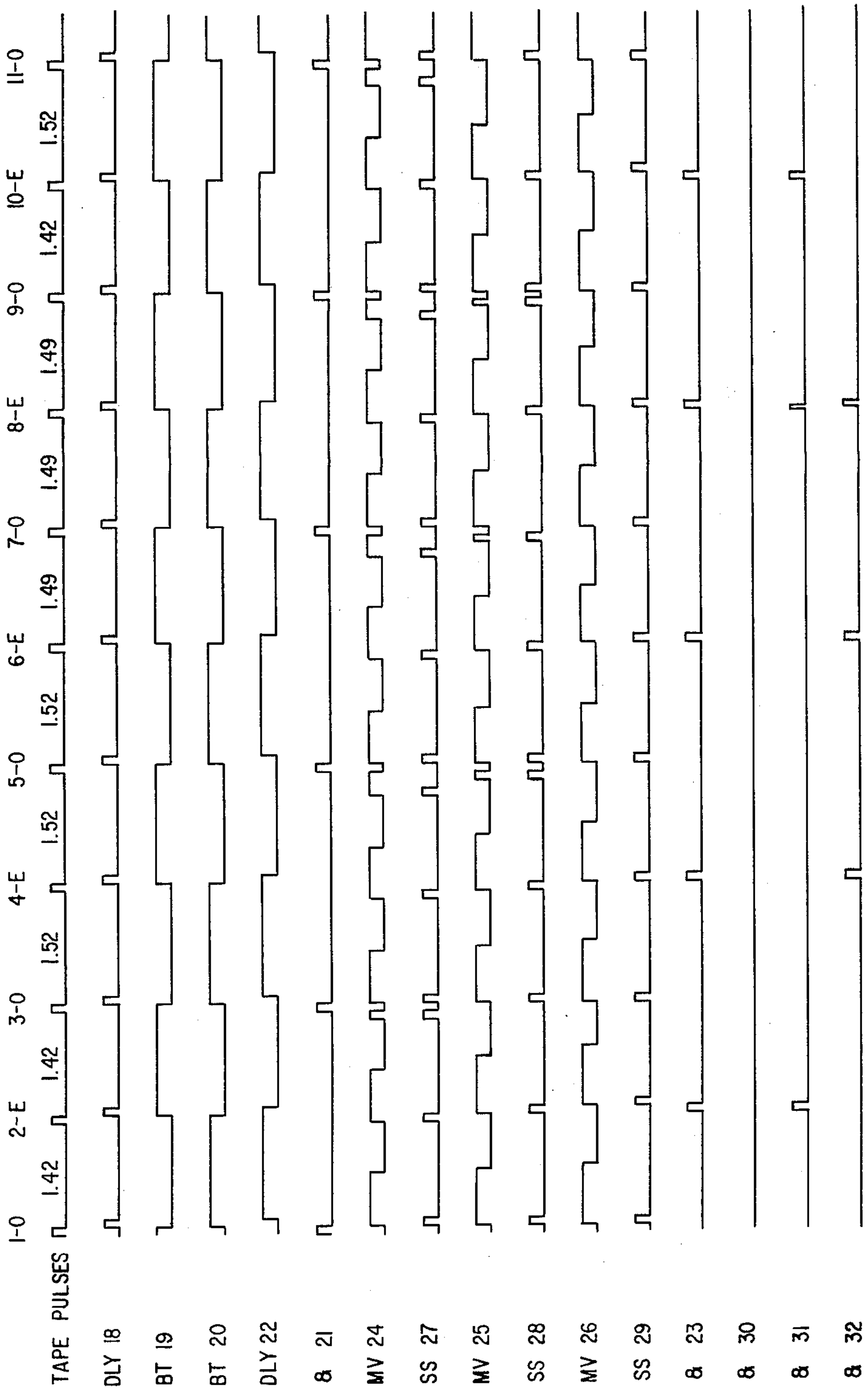
Figure 3B:
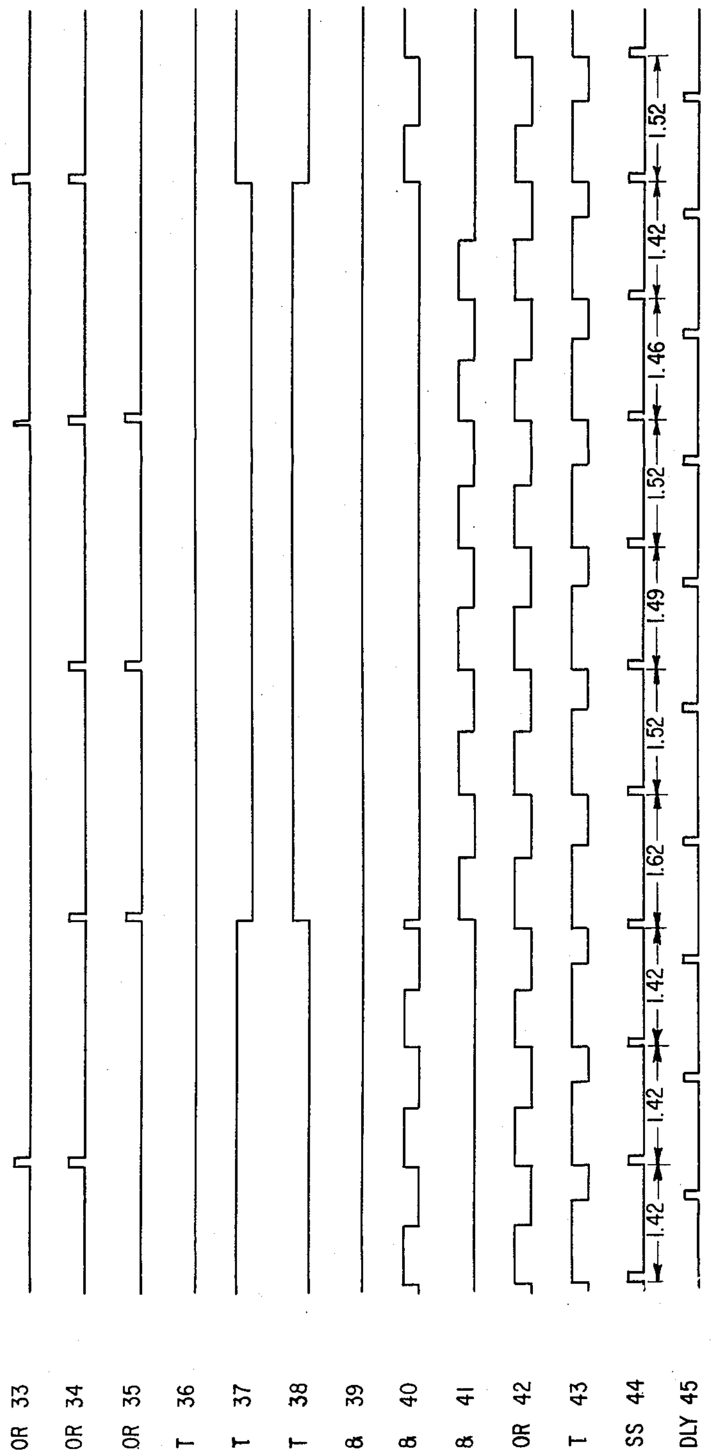

FIGURE 3*a* and 3*b* comprise a timing diagram used in explaining the operation of the invention.

Referring first to FIGURE 1, there is shown a generalized block diagram of the invention. Input data bit pulses from the varying rate source, which may represent binary "1" information in many systems, are introduced at lead 1 to a pulse separation circuit 2. The pulse separation circuit 2 separates the bit pulses received by it from the source and determines which are odd and which are even. All of the odd bit pulses are then transmitted to lead 3 and the even pulses are transmitted to lead 4. Block 5 comprises three independent free-running multivibrator oscillator circuits, each of which operates at a fixed frequency different from any other. These frequencies represent the worst case high, worst case low, and nominal frequencies within which the bit pulse rate from the varying source will fall. The odd bit pulses on lead 3 are all applied in common to a reset terminal of each of the multivibrators so as to reset each multivibrator to the beginning of its cycle. Thereafter, the multivibrators will continuously operate at their fixed rates until another odd bit pulse resets them back to the beginning of their cycles.

The output from the multivibrator having the highest frequency is applied via lead 6 to a compare circuit 9 and via lead 10 to a gating and pulse forming circuit 13. In like fashion, the output of the multivibrator producing a frequency at the nominal rate is applied via lead 7 to compare circuit 9 and via lead 11 to gating circuit 13. The output of the multivibrator having the lowest frequency is applied via lead 8 to compare circuit 9 and via lead 12 to gating circuit 13. The even pulses appearing on lead 4 from pulse separation circuit 2 are applied also to compare circuit 9 wherein they are effectively compared with each of the fixed pulse rates entering from block 5 in order to determine which of the multivibrator rates is closest to the bit pulse rate from the varying source. Control signals are then applied from block 9 via leads 14, 15, and 16 to the gating and pulse forming circuit 13 in order to gate one of the pulse rates appearing on leads 10, 11, and 12 to an output channel 17. The fixed pulse rate so gated through clock 13 normally is that which is closest to the bit pulse rate entering on lead 1. The pulses appearing on lead 17 are therefore the clock pulses which may be used elsewhere in circuitry not shown for gating the data bits to utilization circuitry, such as a buffer register. The gate so selected in block 13 remains conditioned to pass its associated fixed pulse rate until compare circuit 9 determines that the bit pulse rate from the varying source has changed so as to be closer to another of the fixed pulse rates emanating from circuit 5.

Figure 2:
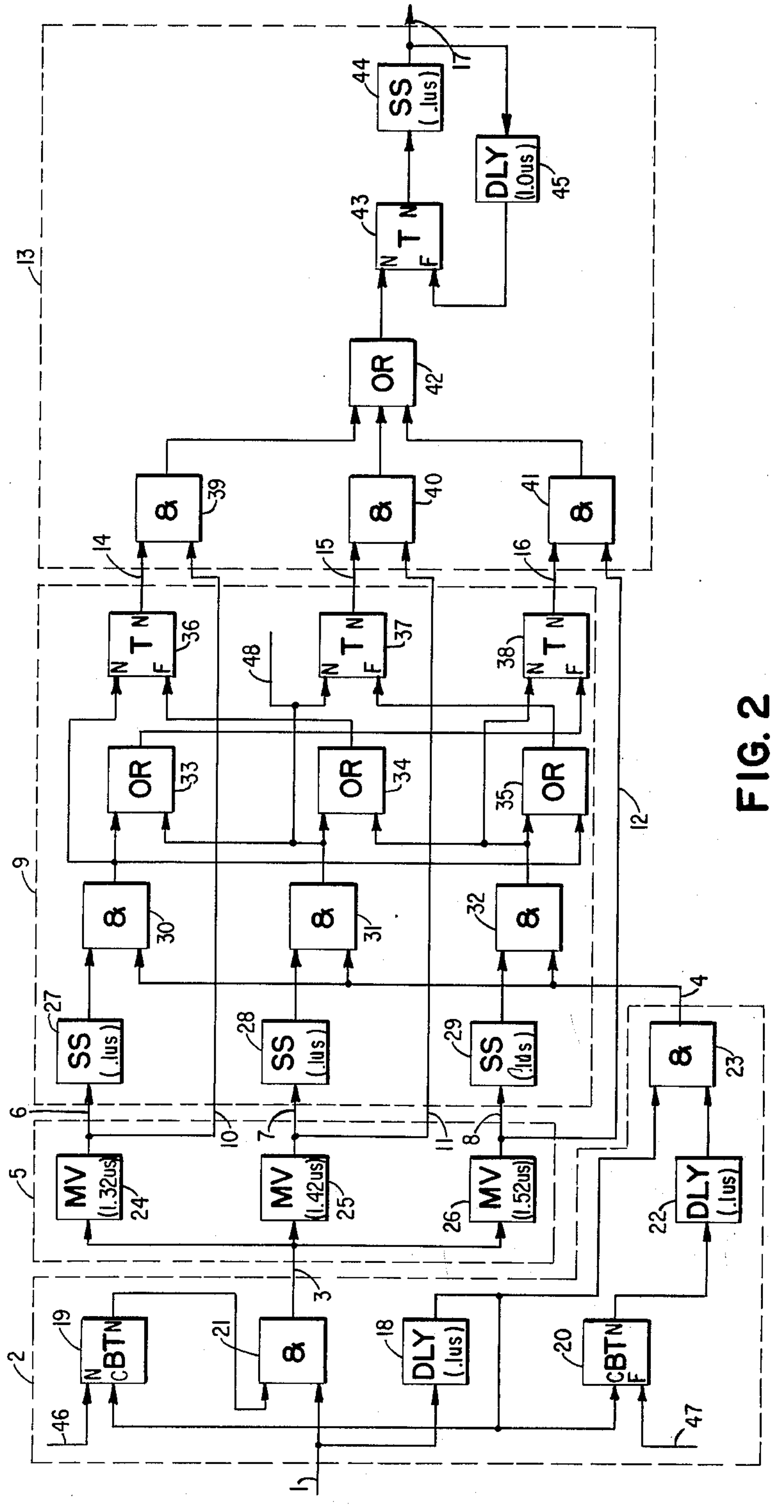

Referring now to FIGURE 2 of the drawings, the detailed construction of each of the blocks shown in FIGURE 1 will be described. In FIGURE 2, individual logical units are grouped together in blocks enclosed by dotted lines which are numbered to correspond with the numbering of the blocks in FIGURE 1. Furthermore, input and output lines from the blocks in FIGURE 2 are correspondingly numbered to those shown in FIGURE 1.

Referring first to block 2, input lead 1 thereto is connected to one input of AND gate 21 and a 0.1 microsecond delay (hereinafter referred to as DLY) 18. The output of DLY18 is connected to the count input of binary trigger (hereinafter referred to as BT) 19 and a BT20. Each of these binary triggers has two stable states and will be switched from one state to the other upon the appearance of each pulse at its count input which is denoted by the letter C in the figure. Such triggers are well known in the art and will not be described in any greater detail. The N output taken from BT19 and BT20 is internally connected so that a positive potential appears thereon when the trigger is in its ON condition. The N input to BT19 is connected so that upon occurrence of a positive pulse on lead 46, the trigger will be set to its ON condition, while the F input to BT20 will set BT20 to its OFF condition upon occurrence of a positive pulse on input lead 47.

The other input to AND gate 21 is connected to output of BT19. Therefore, BT19 must be in its ON condition in order for a pulse appearing on lead 1 to pass through AND gate 21 and appear on its output lead. The output lead from DLY18 is also connected to one input of AND gate 23. The other input to AND gate 23 is derived from a 0.1 microsecond DLY22 whose input is taken from the ON output of BT20. The output leads from AND gate 21 and AND gate 23 comprise output leads 3 and 4, respectively, which are connected to other blocks in the frequency clock circuit.

As before mentioned, the function of block 2 is to separate the incoming data bit pulses on lead 1 so as to direct all of the odd pulses to output lead 4. This is accomplished by conditioning AND gate 21 to pass one set of alternate bit pulses appearing on lead 1, and conditioning AND gate 23 to pass a different set of alternate bit pulses appearing on lead 1. Each bit pulse appearing on lead 1 switches both BT19 and BT20 from one state to the other after a 0.1 microsecond delay through DLY18. Initially, when the clock generator is first put into operation, these triggers are respectively set to the ON condition and the OFF condition by pulses appearing at leads 46 and 47. Then, upon arrival of the first 0.1 microsecond bit pulse from the varying rate source, AND gate 21 is conditioned to pass this pulse, which is odd, due to the fact that BT19 is in its ON state. This same first bit pulse also passes through DLY18 and switches BT19 to its OFF condition and BT20 to its ON condition, after it has already passed through AND gate 21. The presence of DLY22 between the output of BT20 and AND gate 23 maintains AND gate 23 in a blocked condition for 0.1 microsecond after BT20 has been switched to its ON condition by the bit pulse appearing at the output of DLY18. This therefore prevents the first bit pulse appearing at the output of DLY18 from passing through AND gate 23, since it is only unblocked after the first bit pulse has vanished.

Upon arrival of the second bit pulse from the varying rate source, which is even numbered, AND gate 21 is blocked since BT19 is now in its OFF condition. By the time that this second even bit pulse has passed through DLY18 and so set BT19 back to its ON condition, the bit pulse has disappeared from lead 1 to AND gate 21 so that it is not gated to output lead 3. This even pulse also sets BT20 back to its OFF condition and at the same time appears at one input to AND gate 23. However, due to DLY22, the OFF condition of BT20 is not reflected at AND gate 23 until after this even bit pulse has been gated through AND gate 23 to output lead 4. Thus, BT19 and BT20 have been restored to their original conditions. The next following odd pulse changes BT19 and B20 in the same manner as did the first odd pulse, and it is gated through AND gate 21 to output lead 3. The selective gating operation for succeeding even and odd pulses is similar to that described above.

Output lead 3, upon which appears the odd bit pulses from the varying rate source, is connected to block 5 which contains three fixed pulse rates producing means 24, 25, and 26. These pulse producing means in the present embodiment comprise free-running multivibrators (hereinafter referred to as MV) which generate the nominal worst case high, and worst case low frequencies within which the bit pulse rate from the varying rate source will fall. MV24 in the present embodiment has a period of 1.32 microseconds and generates the worst case high frequency. MV25 has a period of 1.42 microseconds and generates the nominal frequency, while MV26 has a period of 1.52 microseconds and generates the worst case low frequency. Each of these multivibrators has a reset terminal to which is commonly applied all of the odd pulses appearing on input lead 3. The presence of a 0.1 microsecond pulse at the reset terminal of a multivibrator inhibits any positive output therefrom, and the trailing edge of this pulse causes the multivibrator to initiate the positive portion of its period, even though the preceding period may not have yet terminated in accordance with free-running repetition rate of the multivibrator. Thus, each odd pulse appearing on lead 1 will effectively reset each of the multivibrators in block 5 so that they all may initiate their respective periods at the same time.

The outputs from each of the multivibrators in block 5 are respectively directed via leads 6, 7, and 8 to compare circuit 9. Single-shot (hereinafter referred to as SS) multivibrators 27, 28, and 29 are respectively associated with input leads 6, 7, and 8 so as to generate a 0.1 microsecond positive pulse in response to the leading edge of each positive waveform appearing from their associated multivibrators. Thus, for example, although each positive waveform during one complete period of MV 24 is 0.66 microsecond long, SS27 generates only a 0.1 microsecond positive output pulse whose leading edge coincides with the leading edge of its positive input pulse from MV24. This may be done by differentiating the leading edge of the positive waveform, thus producing a positive spike which triggers SS27 into its unstable state from which it thereafter times out to its stable state after a period of 0.1 microsecond.

The outputs from SS27, SS28, and SS29 are respectively connected to one input of AND gates 30, 31, and 32. Lead 4 is connected in common to the other inputs and these three AND gates as shown in FIGURE 2. The output of AND gate 30 is connected to one input of each of the OR gates 33 and 35, while the output of AND gate 31 is connected to one input of each of the OR gates 33 and 34. In like manner, the output of AND gate 32 is connected to one input of each of the OR gates 34 and 35.

A plurality of trigger circuits (hereinafter referred to as T) 36, 37, and 38 is also provided within compare circuit 9. Each of these triggers has an ON input N and an OFF input F, and provides an ON output N. Pulses introduced at the ON input to a trigger will set it to its ON condition at which time its ON output will reflect a positive potential thereon. Conversely, a pulse introduced at the OFF input of a trigger will set the trigger to its OFF condition, thereupon producing a lower potential at its ON output. Each trigger is preferably designed using well known techniques so as to be responsive only to input pulses having a width of 0.05 microsecond or greater. As shown in FIGURE 2, the output from AND gates 30, 31, and 32 are respectively connected to the ON inputs of T36, T37, and T38. Furthermore, the outputs from OR gates 33, 34, and 35 are respectively connected to the OFF inputs of T38, T36, and T37. A lead 48 is also connected to the ON input of T37 and to OR gates 33 and 34 for use in initially turning ON T37 and turning OFF T36 and T38.

As before mentioned, the purpose of block 9 is to compare the bit pulse rate from the varying rate source with the three fixed rates produced by the multivibrators of block 5 in order to determine the fixed rate which is the closest to the bit pulse rate. However, not all of the bit pulses are utilized within the block 9, but only the even bit pulses which are applied via lead 4 from pulse separating circuit 2. During the time immediately following the appearance of an odd pulse on lead 3, the three multivibrators 24, 25, and 26 have begun their individual periods in phase with each other so that MV24 reaches the end of its period 0.1 microsecond before MV25 reaches the end of its period. Likewise, MV25 reaches the end of its period 0.1 microsecond before MV26 reaches the end of its period. Thus, SS27, SS28, and SS29 will each emit 0.1 microsecond pulses at the end of these periods which are also spaced 0.1 microsecond apart from each other. If a bit pulse now arrives at input lead 1 during the bit time interval immediately following an odd pulse, then it is gated through AND gate 23 and so appears on one input of AND gates 30, 31, and 32 which are also respectively receiving the time spaced 0.1 microsecond pulses from SS27, SS28, and SS29. If, for example, the even pulse on lead 4 is exactly 1.32 microseconds apart from its preceding odd pulse, it arrives at AND gate 30 in exact coincidence with the 0.1 microsecond pulse arriving from SS27. In such a case, AND gate 30 emits a 0.1 microsecond pulse. However, there would be no overlap of the even pulse at AND gates 31 or 32 with their respective input pulses from SS28 and 29. Therefore, AND gates 31 and 32 would not generate output pulses. The output pulse appearing at AND gate 30 is directed through OR gates 33 and 35 to the OFF input terminals of T37 and T38. Also, this pulse is directly applied to the ON input terminal of T36. The 0.1 microsecond pulse from AND gate 30 is sufficiently wide so as to turn ON T36 and turn OFF T37 and T38.

If, for example, there is exact coincidence between a pulse on lead 4 and the output pulse from SS28, only AND gate 31 passes a 0.1 microsecond pulse which is effective to turn ON T37 and turn OFF T36 and T38. In like fashion, the exact coincidence of a pulse at lead 4 with the output pulse appearing from SS29 will generate an output from only AND gate 32 which in turn will turn ON T38 and turn OFF T36 and T37.

Since the data bit pulses appearing from the varying source may, however, fall anywhere within the range between the worst case low and worst case high frequencies (represented by multivibrators 26 and 24, respectively), there are many cases in which the 0.1 microsecond pulse appearing at lead 4 will overlap with two of the outputs from SS27, SS28, and SS29. Since an AND gate only generates an output pulse whose width is equal to the overlap between all of its input pulses, it is therefore seen that when overlap occurs, two of the AND gates 30, 31, and 32 will emit output pulses whose widths are less than 0.1 microsecond. These two pulses are applied on the ON and OFF inputs to the three triggers in accordance with their connections as shown in FIGURE 2, so that pulses will be applied to the ON inputs of two of the triggers, and to the OFF inputs of all three of the triggers. However, as previously noted, only those triggers whose OFF or ON inputs receive a pulse having a width of at least 0.05 microsecond will actually change state. For example, if the pulse appearing on lead 4 were spaced an interval of 1.44 microseconds from its preceding odd pulse, then it overlaps the 0.1 microsecond pulses being emitted by SS28 and SS29. It is here seen that the bit rate interval is closest to the nominal interval. In the case of SS28, the even pulse overlaps for a period of about 0.08 microsecond. It also overlaps the pulse emitted by SS29 for a period of approximately 0.02 microsecond. Therefore, AND gate 31 emits an output pulse of 0.08 microsecond duration, while AND gate 32 emits an output pulse of 0.02 microsecond duration. Since the leading edge of the even pulse at lead 4 arrives subsequent to the trailing edge of the pulse emitted by SS27, no overlap occurs at the inputs of AND gate 30 which therefore cannot emit an outpulse. The 0.08 microsecond pulse from AND gate 31 is applied to the ON input of T37 and is sufficiently wide to set it to its ON condition. The output from AND gate 31 also passes through OR gates 33 and 34 so as to apply a 0.08 microsecond pulse to the OFF inputs of T38 and T36 respectively. The duration of the pulse at these inputs is sufficient to set the two triggers to their OFF condition.

The 0.02 microsecond pulse from AND gate 32 is also applied to the ON input of T38 and to the OFF inputs of T36 and T37. However, its duration is not sufficient to affect the condition of any of these triggers, so that they are only influenced by the pulse emanating from AND gate 31. If a pulse on lead 4 falls exactly between the pulses generated by two of the single shots, then two of the AND gates 30, 31, and 32 will emit pulses of 0.05 microsecond width. In such a borderline case, none of these pulses may affect the states of any of the triggers.

The output leads 14, 15, and 16 from triggers 36, 37, and 38, respectively, are applied to the gating and pulse forming circuit 13 for use in gating therethrough only one of the outputs of the multivibrators in block 5. The output of each trigger is applied to one input of AND gates 39, 40, or 41, respectively, whose other inputs are respectively connected to the outputs of multivibrators 24, 25, and 26. As before noted, only one of the triggers 36, 37, and 38 is ON at any time so that only one of the AND gates in block 13 may be conditioned to pass signals appearing at its other input. The outputs from AND gates 39, 40, and 41 are directed to the inputs of OR gate 42 whose output is connected to the ON input of T43 whose internal connections are similar to those triggers found in block 9. The output of T43 is connected to SS44 having a time out of 0.1 microsecond. The output of SS44 is connected to an output channel 17 upon which appear the clock pulses of the system which are subsequently used to gate the data bit pulses from the varying rate source into utilization circuitry not shown. The output from SS44 is also directed through a DLY45 of 1.0 microsecond in order to turn OFF T43.

The basic operation of block 13 may be described as follows. The AND gates 39, 40, or 41, whose input is connected to the ON trigger in block 9, allows the output of its associated multivibrator to be directed through OR gate 42 so as to turn ON T43 at the leading edge of the positive multivibrator waveform. When T43 is set to its ON condition, the leading edge of the positive signal which thereupon appears at its ON output causes SS44 to be set to its unstable condition and so to emit a positive pulse of 0.1 microsecond to output channel 17. The 0.1 microsecond pulse from SS44 returns to the OFF input of T43 after 1.0 microsecond delay. Thus, the feedback loop including DLY45 prevents SS44 from emitting more than one output pulse within each bit time. It should also be noted that a trigger within block 9 will remain in its ON condition, thus conditioning its associated AND gate in block 13 to continually pass the output of the associated multivibrator, until it is changed by a determination that the interval between an even pulse appearing on lead 4 and a preceding odd pulse is now closer to the fixed rate produced by another of the multivibrators in block 5. Also, in the absence of bit pulses which thus indicates binary "0" data in many systems, the clock generator will continue to emit clock pulses on lead 17 at the frequency rate determined at the time that the last even pulse appears on lead 1.

The varying rate source to be used with the frequency clock of the present invention may also provide a synshronizing pulse every fifth bit time which is used by the clock to maintain synchronization even though a long string of zeros is appearing in the binary information. The utilization circuitry, not shown herein, must be able to recognize the synchronizing bit for what it is in order to exclude it. Such circuitry does not form a part of the present invention.

The complete operation of the frequency shifting clock will now be explained in conjunction with the timing diagram shown in FIGURES 3*a* and 3*b*. The top of FIGURE 3*b* should be joined to the bottom of FIGURE 3*a*. Assuming that the first pulse to be considered in this description is odd, it will be noted in FIGURE 2 that T19 is in its ON condition and T20 is in its OFF condition, having been placed in their respective conditions by the previous even pulse or by reset pulses appearing at leads 46 and 47, respectively, at the beginning of clock generator use. The incoming odd pulse on lead 1 therefore passes through AND gate 21 and is applied to lead 3. It is further delayed 0.1 microsecond by DLY18 after which it thereupon switches T19 to its OFF condition and T20 to its ON condition. T19 is switched to its OFF condition after the first odd pulse has passed through AND gate 21. Furthermore, the ON condition of T20 is not reflected at AND gate 23 until after this first odd pulse disappears from the other input to AND gate 23.

The odd pulse on lead 3 inhibits the output of all three multivibrators for the duration of this pulse, after which they simultaneously commence their individual cyclic rates. It is further assumed that T37 is in its ON condition at the appearance of the first odd pulse so that the output of MV25 is presently being gated through AND gate 40. Therefore, when MV25 initiates its period after the cessation of the first bit pulse, the leading edge of the positive waveform causes T43 to be switched to its ON condition, thus generating a 0.1 microsecond clock pulse on output lead 17 from SS44. This clock pulse from SS44 occurs exactly in coincidence with the first bit pulse when the fixed 0.1 microsecond delay is neglected. T43 is set to its OFF condition 1.0 microsecond later.

Now assume that a second bit pulse occurs during the next following bit time. This is an even pulse, and it is further assumed that the interval between the first odd pulse and the second even pulse is 1.42 microseconds, which corresponds to the nominal interval of the input bit pulses. Since T19 is now in its OFF condition, the second even pulse cannot be gated through AND gate 21. Although the second even pulse sets T20 to its OFF state upon its arrival at the output of DLY18, the out put of DLY22 remains up at the time that this pulse appears at AND gate 23. Therefore, it is gated to lead 4. Since multivibrators 24, 25, and 26 had been initiated simultaneously by the previous first odd pulse, it is seen from FIGURE 3 that MV25 begins its second period at the time when the second even bit pulse appears on lead 4. The even pulse exactly coincides with the 0.1 microsecond pulse generated by SS28. Therefore, only AND gate 31 emits a pulse which is directed to the ON input of T37 and to the OFF inputs of T36 and T38. Since T37 is already in its ON condition at this time, AND gate 40 remains conditioned and AND gates 39 and 41 remain unconditioned so that the output from MV25 continues to be gated to T43. T43 is again triggered to its ON condition at the beginning of the second period of MV25 so that SS44 generates a 0.1 microsecond clock pulse.

Assuming now that the third bit pulse appears at an interval of 1.42 microseconds from the second pulse, it is noted that this third odd pulse will be gated through AND gate 21 to reset the multivibrators. Upon the appearance of the third odd pulse at the reset terminals of the multivibrators, their outputs are suspended for the duration of this pulse and their periods are again initiated simultaneously at the conclusion of this third odd pulse. As shown in FIGURE 3, MV24 has already initiated its third period before the arrival of the third odd pulse, but its positive output is now interrupted 0.1 microsecond, thereupon to begin again in phase with MV25 and MV26. Therefore, SS27 receives the leading edges of two positive waveforms spaced 0.2 microseconds apart and so emits two 0.1 microsecond pulses within the same bit time. The operation of MV25 at this time, however, is not affected inasmuch as it normally would not initiate its third period of operation until the conclusion of the third odd input pulse. In such case, MV25 begins its third period of operation with no change in interval over its normal operating frequency. Since it is continually being gated through AND gate 40, the beginning of its third period of operation sets trigger 43 to its ON condition and so generates a 0.1 microsecond pulse from SS44 which is used to clock the third odd bit pulse from the varying rate source. In examining the operation of MV26, it is seen that it has not yet completed its second period of operation by the time that the third odd pulse is applied to its reset terminal, so that it begins its third period of operation earlier than it normally would be in the absence of such a reset pulse. Thus, the third odd input pulse resets all of the multivibrators so that they again begin their periods at the same time regardless of the phase difference between them at the time that the third odd pulse initially arrived.

Assuming that the fourth bit pulse appears at an interval of 1.52 microseconds, it is noted that this pulse, being even, will be gated through AND gate 23 so as to exactly coincide with the output from SS29 associated with the 1.52 microseconds interval multivibrator. In such case, the 0.1 microsecond output pulse from AND gate 32 will set T38 to its ON condition and set T37 to its OFF condition. This results in AND gate 41 being conditioned to pass the output from MV26, while both AND gates 39 and 40 are blocked. However, 0.1 microsecond prior to this blocking of AND gate 40, a positive output from MV25 has been gated to set T43 to its ON condition, thereby generating a clock pulse from SS44 which is spaced apart from the previous clock pulse by a 1.42 microsecond interval. This situation will always prevail whenever the frequency of the bit pulse decreases to such an extent that it is now closer to the next lower discrete loop frequency. In such case, the compare circuit does not instantaneously reflect the new increased interval but allows a clock pulse to be generated at the old interval. However, the frequency shifting clock is a digital device in which it is only desired to generate clock pulses which approximately coincide with the data bit pulses. Furthermore, in the normal operation, the changes in intervals between successive bit pulses are fractions of a 0.1 microsecond interval, so that the trigger circuits in most cases gate the fixed pulse rate which is closest to the bit pulse rate.

It is now believed that the operation of the frequency shifting self-synchronizing clock is apparent from the preceding description and from the timing chart of FIGURE 3 which indicates the treatment of eleven successive bit pulses from the varying rate source. Although no gaps in the arrival of bit pulses are shown, which would represent binary "0" information, it should be apparent that in the absence of bit pulses, no resetting of multivibrators 24, 25, and 26 can occur, and no change can occur in the settings of the triggers 36, 37, and 38, so that the clock pulses appearing at the output of lead 17 occur at a fixed frequency determined by the preceding bit pulses. Furthermore, even though a long string of successive binary "0" bits are present in the data, the clock does not fall out of phase with the source to any great extent, since there are synchronizing bit pulses spaced every fifth bit time which are used to maintain the clock in approximate synchronism with the scanning rate of the storage medium. Thus, the frequency shifting self-synchronizing clock of the present invention provides an effective way of generating a source of clock pulses whose frequency rate approximately equals the rate of information data bit pulses obtained from a varying rate source.

While a particular embodiment of the invention has been shown, it will be understood that the invention is not limited thereto since many modifications may be made, and it is therefore contemplated by the appended claims to cover any such modications as fall within the spirit and scope of the invention.

What is claimed is:

1. A frequency shifting self-synchronizing clock responsive to bit pulses from a varying rate source, comprising a plurality of free running means each adapted to produce pulses at a fixed rate different from the pulse rates produced by any other of said plurality of means, an output channel, means for determining which of said fixed pulse rates is closest to the bit pulse rate from said varying source, and means responsive to said determining means for directing said closest fixed rate pulses to said output channel.

2. A frequency shifting self-synchronizing clock according to claim 1 in which said determining means is responsive only to certain bit pulses received from said varying source.

3. A frequency shifting self-synchronizing clock according to claim 1 in which said determining means is responsive only to alternate bit pulses received from said source.

4. A frequency shifting self-synchronizing clock according to claim 1 in which each of said pulse producing means is reset to the beginning of its cycle when certain bit pulses are received from said source.

5. A frequency shifting clock according to claim 4 in which said determining means is only responsive to bit pulses other than said certain pulses.

6. A frequency shifting clock according to claim 1 in which each of said pulse producing means is reset to the beginning of its cycle when alternate bit pulses are received from said source.

7. A frequency shifting clock according to claim 6 in which said determining means is only responsive to bit pulses other than said alternate bit pulses.

8. A frequency shifting self-synchronizing clock responsive to bit pulses from a varying rate source, comprising a plurality of free running oscillator means each adapted to produce pulses at a fixed rate different from the pulse rates produced by any others of said oscillator means, an output channel, a first plurality of AND gates for passing said fixed pulse rates to said output channel, a second plurality of AND gates for comparing pulses in each of said fixed pulse rates with bit pulses from said varying source, and means responsive to the outputs from said second plurality of AND gates for conditioning one of said AND gates in said first plurality to pass the fixed pulse rate which is closest to said bit pulse rate from said varying source.

9. A frequency shifting self-synchronizing clock according to claim 8 in which said conditioning means includes a plurality of trigger circuits each responsive to a certain minimum output signal from one of said AND gates of said second plurality for conditioning one of said AND gates in said first plurality to pass its associated fixed rate.

10. A frequency shifting self-synchronizing clock according to claim 8 which further includes means for directing only every alternate bit pulse from said variable source to said second plurality of AND gates.

11. A frequency shifting self-synchronizing clock according to claim 10 in which said last-named means comprises a single binary counting trigger circuit responsive to all of said bit pulses, a single AND gate having one input connected to receive all of said bit pulses and its output connected to said second AND gate plurality, and means connecting the output of said binary trigger to the other input of said single AND gate.

12. A frequency shifting clock according to claim 8 which further includes means responsive to alternate bit pulses from said variable source for resetting each of said plurality of oscillator means to the beginning of its cycle.

13. A frequency shifting self-synchronizing clock according to claim 12 in which said resetting means comprises a single AND gate having one input connected to receive all of the bit pulses from said source and its output connected to a reset terminal of each oscillator means, a single binary counting trigger responsive to all of said bit pulses, and means connecting the output of said binary trigger to the other input of said single AND gate.

14. A frequency shifting self-synchronizing clock responsive to bit pulses from a varying rate source, comprising first and second gates each connected to receive the bit pulses from said varying source, a plurality of oscillator means each adapted to produce pulses at a fixed rate different from the pulse rate produced by any other oscillator means, each oscillator means also including an input terminal for resetting said oscillator means at the beginning of its cycle, an output channel, a plurality of gating means for connecting said plurality of oscillator means to said output channel, comparing means responsive to pulses in each of said fixed pulse rates and to bit pulses from said varying source for determining which of said fixed pulse rates is closest to said bit pulse rate, means connecting said oscillator means to said comparing means, means connecting the output of said first gate to said comparing means, means connecting the output of said second gate to the reset inputs of said oscillator means, means responsive to said bit pulses for alternately conditioning said first gate and said second gate to pass said bit pulses, and means connecting said comparing means to said plurality of gating means for selecting one of said gating means to pass the fixed pulse rate which is closest to said bit pulse rate.

References Cited in the file of this patent

UNITED STATES PATENTS 2,555,999 Ringlee ---------------- June 5, 1951